United States Patent [19]

Laurent et al.

[11] Patent Number: 4,796,723

[45] Date of Patent: Jan. 10, 1989

[54] SYSTEM FOR TRANSMITTING ENERGY THROUGH AN APPARATUS USABLE FOR SUBSOIL PROSPECTION, LOWERED INSIDE A WELL OR DRILL HOLE

[75] Inventors: Jean Laurent, Oregeval; Charles Naville, Massy; Rene Paterna, Pechabou, all of France

[73] Assignee: Institut Francais du Petrole & Compagnie Generale De Geophysique, Rueil-Malmaison, France

[21] Appl. No.: 936,618

[22] Filed: Dec. 1, 1986

[30] Foreign Application Priority Data

Nov. 29, 1985 [FR] France ................. 85 17832

[51] Int. Cl.[4] .............................. G01V 1/40
[52] U.S. Cl. ..................... 181/102; 181/106; 181/119; 181/121; 367/911; 367/912; 166/206; 175/1
[58] Field of Search ............. 175/1, 93, 97, 106, 175/107, 293, 300, 304; 166/153, 239, 206, 207, 217; 367/25, 140, 143, 911, 912; 181/102, 103, 104, 105, 106, 113, 119, 121, 142, 400, 401, 402; 137/830, 831, 832

[56] References Cited

U.S. PATENT DOCUMENTS

| | | |
|---|---|---|
| 2,898,084 | 8/1959 | Eckel et al. .................. 175/1 |
| 3,718,205 | 2/1973 | Fair et al. ..................... 367/189 |
| 3,845,837 | 11/1974 | McEvers, Jr. et al. ......... 181/106 |
| 4,064,964 | 12/1977 | Norden ......................... 181/121 |
| 4,483,394 | 11/1987 | Peppers et al. ............... 166/113 |
| 4,489,781 | 12/1984 | Weeks ........................... 166/208 |
| 4,648,478 | 3/1987 | Dedole et al. ................ 181/119 |

FOREIGN PATENT DOCUMENTS

| | | |
|---|---|---|
| 0136236 | 4/1985 | France ................. 181/121 |
| 1493931 | 10/1986 | France . |
| 2458362 | 10/1986 | France . |
| 2067289 | 7/1981 | United Kingdom ....... 181/121 |

Primary Examiner—Brian S. Steinberger
Attorney, Agent, or Firm—Antonelli, Terry & Wands

[57] ABSTRACT

A system is provided for transmitting energy to an apparatus, such as a pulsed or vibratory seismic source, lowered inside a well or drill hole, It includes a structure anchorable in a well, mobile means whose linear displacement with respect to the anchorable structure causes the creation of energy and means for accumulating the energy created, a rigid column connected to said mobile means and drive means disposed outside the well for moving the rigid column linearly. The mobile means and the accumulation means may be formed by a weight and a device for raising this latter or else by a hydraulic system including a linear pump.

4 Claims, 3 Drawing Sheets

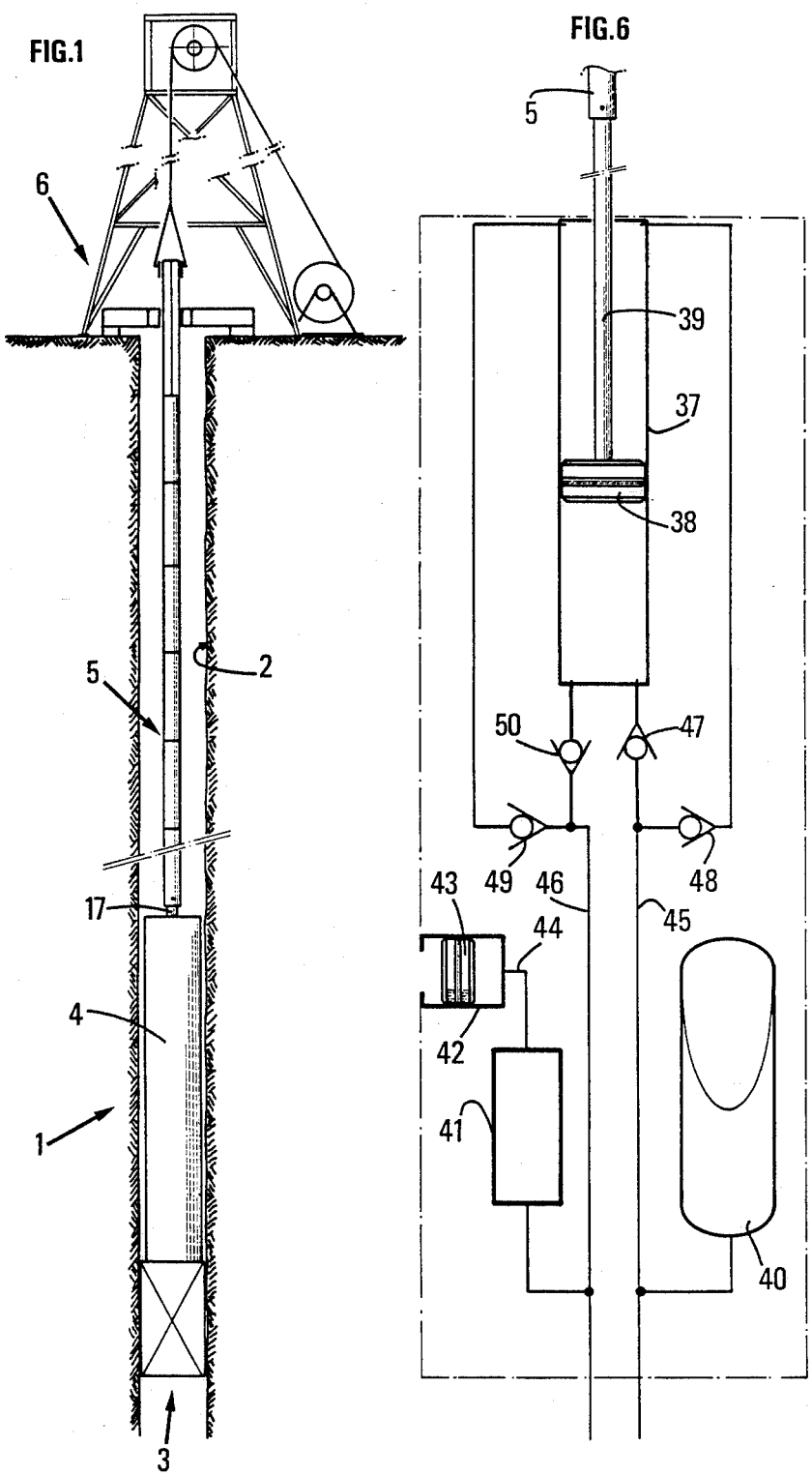

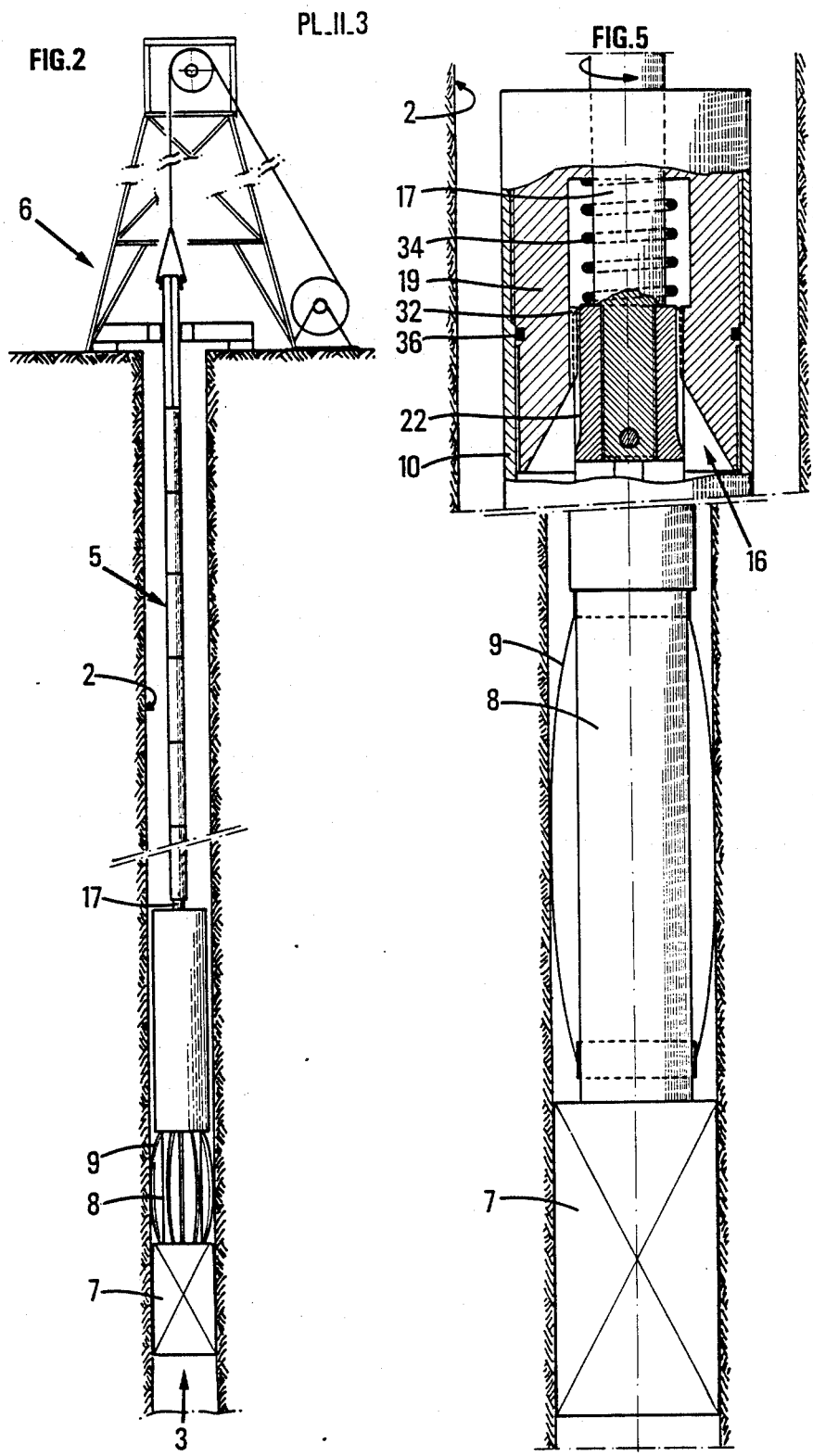

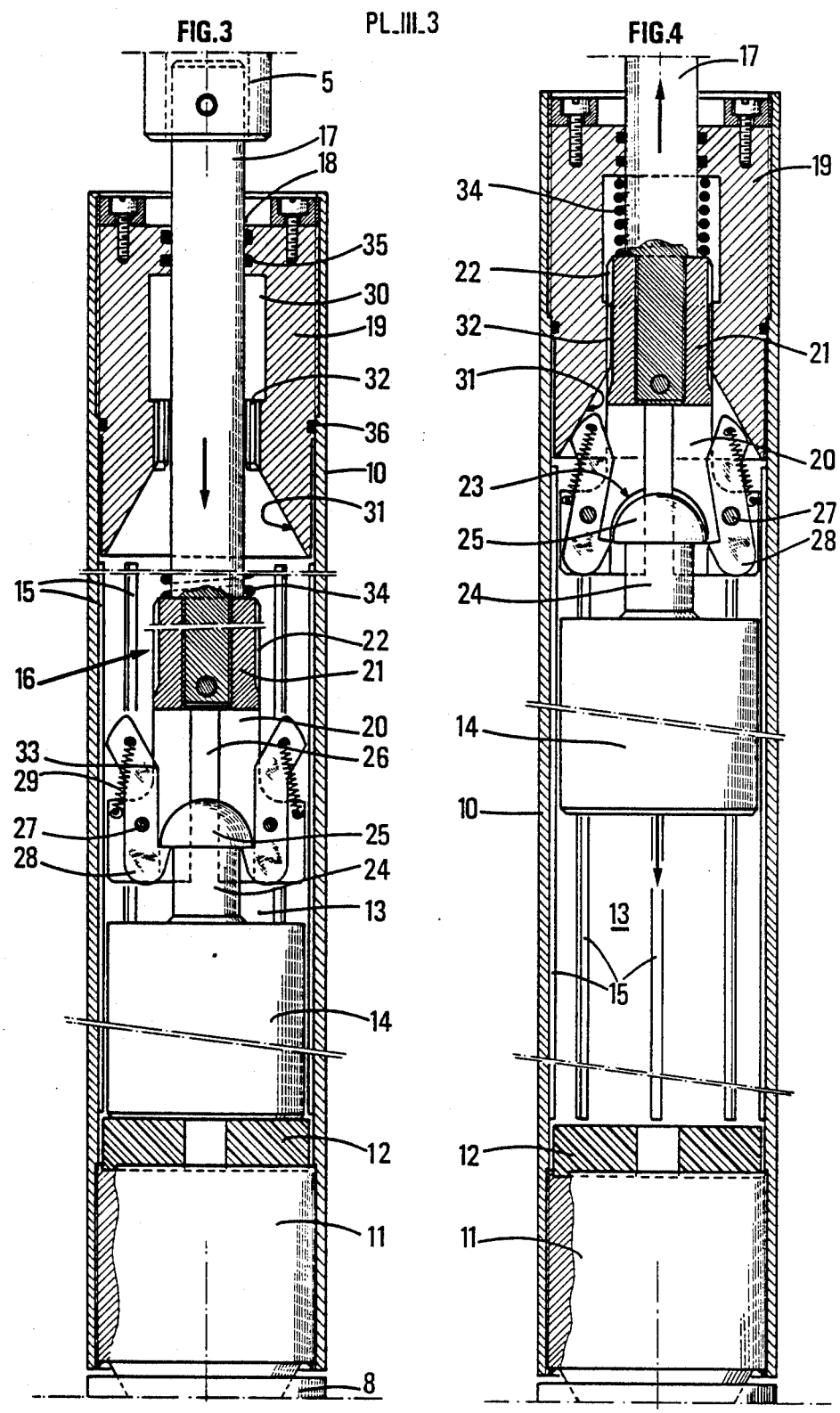

SYSTEM FOR TRANSMITTING ENERGY THROUGH AN APPARATUS USABLE FOR SUBSOIL PROSPECTION, LOWERED INSIDE A WELL OR DRILL HOLE

BACKGROUND OF THE INVENTION

1. Field of the Invention

The invention relates to a system for transmitting energy to an apparatus lowered inside a well or drill hole.

The system applies in particular to supplying with energy to seismic sources operating in wells down to relatively great depths.

Many seismic prospection methods comprise the use of seismic sources lowered into wells or drill holes and activated successively at a plurality of positions at different depths. The waves emitted, are received by receivers disposed in other wells or drill holes, which allows a high power of resolution to be obtained, or else they are disposed on the surface so as to restore oblique seismic profiles. The energy efficiency of seismic sources in wells is generally much better than that of sources operating on the surface, because they emit the seismic waves under the weathered layer whose propagation characteristics are unfavorable.

2. Description of the Prior Art

A known method for supplying the energy required for the operation of seismic sources operating at relatively small depths consists in connecting them by piping to a hydraulic device installed at the top of the well. The pressurized hydraulic fluid which is delivered to them is used for producing vibrations or pulses. Such a method, which is described for example in the U.S. Pat. Nos. 3,221,833 an 3,718,205, is unsuitable when the operating depth becomes great because of the difficulty in providing hydraulic connections in wells which are often of small dimensions.

In another known method, potential energy is accumulated at a point in a well, at a relatively small depth, by raising, from a surface installation and by means of cables, a weight which may slide about a guide tube. At the base thereof is fixed a target element. With intermittent anchorage means the target element may be immobilized, and the associated guide tube, at a chosen depth. The accumulated energy is released by the weight falling against the target element, which generates seismic waves. Such a method which is described for example in the European patent application EP No. 136,236, is suitable for use down to relatively small depths in wells which are uncongested, relatively vertical and not filled with liquid, because the weight is not isolated from the well and because it is reset by pulling on cables.

Another system more compatible with supply of seismic sources operating at great depths includes a surface installed electric generator and electric conductors for connecting them thereto. These conductors are very often gathered together with data transmission conductors in a single multiple function electro-carrying cable. Such a system is used, for example, for supplying with electric energy pulsed seismic sources such as those described in the published, French patent applications Nos. 2,555,761, 2,558,601 and 2,563,919, where the energy required for generating the pulses is supplied by a hydraulic pump driven by an electric motor fed from the surface by the electro - carrying cable.

The drawback of electro-carrying cables is their relatively low current flow. The electric power which they may transport becomes quickly insufficient for resetting seismic sources or causing them to operate at great depths, because of the very high hydrostatic pressure which reigns there.

A method is also known for generating seismic waves at the bottom of a well being drilled, which consists essentially in inserting a telescopic part between the drill-pipe string and the drilling tool, and intermittently releasing the tension exerted from the surface so that this telescopic part retracts.

Such driving in accumulates hydraulic energy. With a certain delay it is transmitted to the drilling tool which strikes against the bottom of the drill hole. This method, which is described in the US patent No. 2,898.084, is adapted for use exclusively at the bottom of a well.

SUMMARY OF THE INVENTION

The system of the invention avoids the above mentioned drawbacks.

It comprises an elongate rigid body isolated from the inside of the well, means for anchoring the rigid body to the inside of the well, mobile means displaceable linearly inside the body and whose displacement causes accumulation of energy, a rigid column connected to the mobile means and drive means disposed outside the well for drawing the rigid column linearly.

The mobile accumulation means may include a weight accumulating potential energy by a traction force exerted on the rigid column.

The mobile accumulation means may also include springs deformed by action on the rigid column.

The energy accumulation means may also include a linear pump actuated by means of the rigid column and a hydraulic accumulator.

The energy stored in the accumulator may serve for actuating for example a vibrator or else for resetting a pulsed seismic source after successive tripping operations. The rigid column is formed, for example, by a very robust drill pipe string which is suitable not only for traction forces but also for compressive forces. The instantaneous power transmitted is very high. By exerting a traction force on a drill pipe string, very high power may be transmitted sufficient for resetting or for causing to operate any seismic source whatever down to depths of several kilometers.

One embodiment of the system comprises an expansible coupling element which may be intermittently coupled against the wall of the well, means for expanding the coupling element wherein the elongate body is provided with an inner cavity where the weight is movable between a first low position and a second high position, and wherein the mobile energy accumulation means include a handling assembly for moving the weight from its first to its second position and to hold it there intermittently, the handling assembly being connected to the rigid column which is connected to the traction means and the apparatus to which the accumulated energy is transmitted include a target element integral with the rigid body, which is struck by the weight during its fall from its second to its first position. In a particular embodiment, the expansible coupling element is expanded by rotation of the rigid column.

By exerting a traction force on a drill pipe string, or a rotation thereof, the seismic source may be reset down to a depth of several kilometers even in a highly deflected well and the anchorage means may also be uncoupled when it is required to move it from one position to another. The drill pipe string may also be used for establishing a fluid flow so as to cool the seismic source in the case of use at a great depth.

BRIEF DESCRIPTION OF THE DRAWINGS

Other features and advantages of the system of the invention will be clear from reading the description of several embodiments given by way of non limitative examples, with reference to the accompanying drawings in which:

FIG. 1 shows schematically a structure anchorable inside a well and suspended from a rigid column whose translational movement, controlled from the surface, provides the transmission and accumulation of energy;

FIG. 2 shows schematically a similar structure having an anchorage element of the packer type, expandable by rotation of the rigid column, the translation thereof also providing the transmission of energy and accumulation thereof.

FIG. 3 shows the sectional view of the system of FIG. 2 where the translation of the column is used for raising a weight with respect to the target element, from a position of contact therewith;

FIG. 4 shows a sectional view of the same system in a high position where the fall of the weight is initiated;

FIG. 5 shows a sectional view of the same system in a position where rotation of the drill pipe string controls the anchorage of the source; and FIG. 6 shows schematically a second embodiment where the accumulation of energy is obtained by translation of the column acting on a linear pump, forming part of a hydraulic assembly.

DESCRIPTION OF THE PREFERRED EMBODIMENTS

The system of the invention includes. (FIG. 1) the use of a structure 1 adapted to be lowered into a well or drill hole 2. This structure has a coupling or anchorage device 3 adapted to be applied intermittently against the wall of the well. This device may, for example, have mobile shoes applied against the wall of the well by moving apart handling arms by means of actuating cylinders. As variable volume coupling device a packer is advantageously used which, by expansion caused by mechanical or hydraulic means, may be applied against the wall of the well.

The coupling device is integral with a system 4 for creating energy and accumulating it, which includes elements movable with respect to the structure as will be seen further on in connection with the embodiments of FIGS. 3 to 6.

These elements are connected, by a rigid column 5 formed for example by a pipe or a string of interconnected drill pipes, to a handling device 6 of a type known in particular in the field of well drilling and comprising a mast or derrick, and means for coupling to the column including a tackle, a winch and drive means adapted for translating the column parallel to its axis and to cause it to rotate on itself.

FIGS. 3 to 5 show one example of embodiment where the system for accumulating energy, includes a weight and means for raising the weight and thus communicating thereto a certain potential energy, this system being combined with a device which uses the energy accumulated by the weight for generating seismic pulses. The anchorage device 3 is formed advantageously by a packer 7 having an expandable peripheral enclosure whose expansion is obtained by rotating a central part 8. Flexible blades 9, bearing against the wall of the well, allow rotation of the central part 8 relatively to the enclosure when this latter is in its retracted state.

The system for creating and accumulating energy and the associated seismic source include (FIGS. 3 to 5) a hollow tubular body 10 integral with a first end of the central part 8 of the packer. A target element 11 defines body 10 at its first end. On an upper face if the body 10 is disposed a disk 12 made from a shock absorbing material. Tubular body has an inner cavity 13 where a weight 14 may slide. Rails 15 fixed to the inner wall of the tubular body along generatrices thereof guide the sliding of the weight between a first position (rest or impact position) where it is in contact with the target element 11 and a second position high or tripping position) to which it is brought by lifting means 16.

These lifting means include a rod 17 able to slide in an opening 10 formed in,,the end wall of a tubular end piece 9 closing body 10 at an end opposite the packer 7. A first end of rod 17, external to body 10, is fixed to the base of column 5. The lifting means also include a coupling mandrel 20 of a section adapted to that of the cavity 13 which ,is provided with a cylindrical extension 21. This extension has a threaded bore into which is screwed the second end of rod 17 and the splines 22 which are formed at its periphery. The end wall of the mandrel, on the same side as weight 14, includes a cavity of rounded shape 23. Weight 14 is extended at its upper part on the mandrel 20 side by a rod 24 ending in a rounded head 25 of a shape adapted to that of the cavity 23. Four radial grooves 26 are formed in the mandrel 20. About pins 27 fixed to the inside of these grooves four bent hooks 28 may pivot between a closely spaced position and a spaced apart position. Springs 29 fixed to mandrel 20 return hooks 28 to their closely spaced position. The section of the rounded head 25 is greater than the spacing between hooks 28 in the rest position so that, after being moved apart by the penetration of head 25 into cavity 23, they snap under the edges thereof and couple it to the mandrel 20.

The tubular end piece 19 has a cylindrical cavity 30 opening into the inner cavity 13 through a truncated cone shaped opening 31. The cylindrical cavity 30 has over a part at least of its length splines 32 adapted for meshing with the splines 22 of the extension 21 of the mandrel, when the rod 17 of the lifting means is close to its high or maximum extraction position (FIGS. 4, 5).

The form of the bend 33 of each bent hook 28 is chosen so that the movement for extracting rod 17 close to its high position brings them into abutment against the truncated cone shaped opening 31 of the inner cavity 30 and causes them to rock to their spaced apart position.

A spring 34 is disposed about rod 17. It bears on the cylindrical extension 21 of mandrel 20. When this latter is in the high position, spring 34 comes to bear against the bottom of cavity 30 and brakes the movement for extracting the rod. Seals 35, 36 are disposed in the opening 18 of the end wall of end piece 19, as well as between this latter and the tubular body 10 for isolating the internal cavity 13 from the fluid external to the device.

The system operates in the following way:

When it is lowered into a well weight 14 is in contact with the target element 11, 12, as shown in FIG 3. The tubular body 10 is suspended under the rigid column 5. Mandrel 20 is in the extraction position (FIGS. 4 and 5).

The corresponding splines 22 and 32 are engaged with each other, which locks the tubular body 10 and column 5 in rotation.

The handling device 6 (FIG. 2) lowers the tubular body 10 and the associated packer 7 to the depth where it is desired to provide a seismic emission, by successive additions of drill pipes to column 5. Since the flexible blades 9 prevent rotation of packer 7, a torque is exerted on the drill pipe string from the surface. Through the meshed splines (FIG. 5), the torque is transmitted to the tubular body 10 and consequently to the central part 8 of the packer. This causes an expansion of the packer which is anchored against the wall of the well.

With the packer anchored, column 5 and rod 17 are lowered so that the mandrel 20 comes into contact with weight 14 and so that the hooks 28 grip the rounded head 25 thereof (FIG. 3).

A traction force is then exerted on the drill pipe string so as to bring the mandrel 20 close to its high position where the bends 33 of hooks 28 bear against the wall of the truncated cone shaped opening 31. The traction force then causes the hooks to move apart, thus releasing the weight (FIG. 4) which falls down as far as the target element. The impact generates acoustic pulses which are transmitted directly to the surrounding formations through the packer 7.

When the device is to be transferred to a different depth, rod 17 is held in the extraction position and column 5 is rotated in the opposite direction, so as to contract the packer.

In another embodiment, the system 4 for accumulating energy and restoring it after a delay includes (FIG. 6) a linear pump formed by a pump body 37, inside which a piston 38 sealingly slides having a rod 39 which is fixed to the end of column 5. The system also includes a hydraulic accumulator 40, a reservoir 41 and a cylinder 42 for equalizing the static pressure in which a piston 43 slides freely and sealingly. The ends of cylinder 42, on each side of piston 43, communicate respectively with the outside of the system and with the reservoir 41 through a duct 44. Accumulator 40 and reservoir 41 communicate respectively with two ducts 45, 46. Each of ducts 45 and 46 communicates with the opposite ends of the pump body through two non return valves referenced 47 and 48 for one and 49 and 50 for the other. A tracti force or a thrust exerted on column 5 results in recharging the accumulator 40.

The hydraulic energy accumulated may be used with a delay for different applications and in particular for actuating well seismic sources which are connected to the ducts 45, 46. These sources may be hydraulic vibrations or else devices for generating seismic pulses by percussion or implosion, such as those described in the above mentioned French patent applications. When the seismic waves are applied to the formations surrounding the well through a hydraulic packer, the expansion thereof may be provided by means of the energy stored in the accumulator 40.

The power which it is possible to transmit to an energy accumulation device anchored in a well, by action on a rigid column, may reach several tens of kilowatts, which is very much greater than the electric delivery of a conventional electro-carrying cable and allows user apparatus to be recharged down to considerable depths.

Still within the scope of the invention, the movement of the rigid column may be used for loading springs, release of these springs being used for example for projecting a weight against a target element anchored in the well, or else for supplying energy to an electric generator, either directly, or through a hydraulic turbine.

What is claimed is:

1. A system for providing energy to a seismic source adapted to be lowered in a deep wellbore, the system comprising a rigid elongated hollow body provided with at least one inner cavity communicating with an outside of the body through an opening, mobile means linearly displaceable in said at least one inner cavity including a rod adapted to slide through said opening in the elongated hollow body and sealing means for isolating an interior of the body from the deep wellbore, traction on said mobile means through said rod providing for a sliding thereof in the elongated hollow body and the accumulation of energy within said elongated hollow body, releasable anchoring means for coupling said elongated hollow body to walls of the wellbore, a rigid column secured to said rod, and drive means outside the wellbore for linearly pulling the rigid column when the elongated hollow body is coupled to the walls of the wellbore, said seismic source comprising generating means disposed within said elongated hollow body,
wherein said mobile means includes a piston rigidly connected with said rod and adapted for sealingly sliding in at least one chamber upon traction on said rigid column in said at least one chamber containing a hydraulic fluid, a hydraulic accumulator and valve means for accumulating hydraulic fluid pressurized by the sliding of said piston whereby the seismic source provided with the releasable anchoring means can be hydraulically energized.

2. A system as claimed in claim 1, wherein said mobile means further includes a mass means movable inside the body between a lower first position and higher second position, handling means connected with said rod for displacing said mass means up to said second position by traction upon said rigid column and intermittently holding the mass means, said seismic source including a target-element rigidly connected with the elongated hollow body and in contact with the mass means in the lower position thereof, energy accumulated by pulling on said rigid column being applied to the walls of the wellbore by impact of the mass means falling on the target element from said second position.

3. A system for providing energy to a seismic source adapted to be lowered in a deep wellbore comprising a rigid elongated hollow body provided with at least one inner cavity communicating with an outside of the body through an opening, mobile means linearly displaceable in said at least one inner cavity including a rod adapted to slide through said opening in the elongated hollow body, and sealing means for isolating an interior of the elongated hollow body from the wellbore, traction on said mobile means through said rod providing for a sliding thereof in the elongated hollow body and for accumulation of energy within said elongated hollow body, releasable anchoring means for coupling said elongated hollow body to the walls of the wellbore, a rigid column secured to said rod and drive means outside the wellbore for linearly pulling the rigid column when the elongated hollow body is coupled to the walls of the wellbore, said mobile means also including mass means movable inside the elongated hollow body between a lower first position and a higher second position, handling means connected with said rod for displacing said mass means up to said second position by traction upon said rigid column and intermittently holding the mass means, said seismic source being disposed in said elongated hollow body and including a target-element rigidly connected the elongated hollow body and in contact with the mass means in the first position thereof, wherein said energy accumulated by pulling on said rigid column, and said seismic source being applied to the walls of the wellbore by impact of the mass means falling on the target element from said second position, and wherein said mobile means includes spring means deformed by said mass means when displaced towards said second position.

4. A system for providing energy to a seismic source adapted to be lowered in a deep wellbore comprising a rigid elongated hollow body provided with at least one inner cavity communicating with an outside of the elongated hollow body through an opening, mobile means linearly displaceable in said at least one inner cavity including a rod adapted to slide through said opening in the elongated hollow body, and sealing means for isolating an interior of the elongated hollow body from the wellbore, traction on said mobile means through said rod providing for a sliding thereof in the elongated hollow body and accumulation of energy within said elongated hollow body, releasable anchoring means for coupling said elongated hollow body to walls of the wellbore, a rigid column secured to said rod and drive means outside the wellbore for linearly pulling the rigid column when the elongated hollow body is coupled to the walls of the wellbore, said mobile means including a mass means movable inside the elongated hollow body between a lower first position and a higher second position, handling means connected with said rod for displacing said mass means to said second position by traction upon said rigid column and intermittently holding the mass means, said seismic source being disposed in said elongated hollow body and including a target-element rigidly connected with the elongated hollow body and in contact with the mass means in the first position thereof, energy accumulated by pulling on said rigid, and said seismic source being applied to the walls of the wellbore by impact of the mass means falling on the target element from said second position, said releasable anchoring means including an expandable coupling element provided with a peripheral enclosure expandable by rotation of a central part integral with the elongated hollow body, and means for expanding said pheripherial enclosure including elements for interlocking in rotation said rigid column and said elongated hollow body for one position, and utilizing at least the sliding rod and drive means for intermittently rotating said rigid column.

* * * * *